(12) United States Patent
Zich et al.

(10) Patent No.: US 7,052,000 B2
(45) Date of Patent: May 30, 2006

(54) LIQUID DISTRIBUTOR AND METHOD FOR OPERATING THE SAME

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 0 days.

(21) Appl. No.: 10/220,962

(22) PCT Filed: Feb. 6, 2001

(86) PCT No.: PCT/EP01/01250

§ 371 (c)(1),
(2), (4) Date: Oct. 15, 2002

(87) PCT Pub. No.: WO01/66213

PCT Pub. Date: Sep. 13, 2001

(65) Prior Publication Data

US 2003/0090009 A1    May 15, 2003

(30) Foreign Application Priority Data

Mar. 8, 2000 (DE) ............................ 100 10 810

(51) Int. Cl.
*B01F 3/04* (2006.01)
(52) U.S. Cl. .................... 261/97; 261/112.2
(58) Field of Classification Search ............ 261/97, 261/110, 112.1, 112.2, DIG. 72
See application file for complete search history.

(56) References Cited

U.S. PATENT DOCUMENTS

| | | | | |
|---|---|---|---|---|
| 4,333,894 A | * | 6/1982 | Hoppe et al. | 261/96 |
| 4,842,778 A | * | 6/1989 | Chen et al. | 261/97 |
| 4,950,430 A | * | 8/1990 | Chen et al. | 261/112.2 |
| 5,224,351 A | * | 7/1993 | Jeannot et al. | 62/643 |
| 5,876,638 A | * | 3/1999 | Sunder et al. | 261/112.2 |
| 6,286,818 B1 | * | 9/2001 | Buhlmann | 261/97 |
| 6,357,728 B1 | * | 3/2002 | Sunder et al. | 261/112.2 |
| 6,427,985 B1 | * | 8/2002 | Kaibel et al. | 261/112.2 |
| 6,475,349 B1 | * | 11/2002 | McKeigue et al. | 159/43.1 |
| 6,554,965 B1 | * | 4/2003 | Hartmann et al. | 202/158 |
| 6,560,990 B1 | * | 5/2003 | Hayashida et al. | 62/625 |
| 6,565,629 B1 | * | 5/2003 | Hayashida et al. | 95/211 |
| 2002/0195727 A1 | * | 12/2002 | Sunder | 261/94 |

FOREIGN PATENT DOCUMENTS

| | | |
|---|---|---|
| DE | CH 547 120 | 2/1974 |
| DE | 29 21 270 | 11/1980 |
| DE | 0 190 435 | 8/1986 |
| DE | 0 201 614 | 11/1986 |
| DE | 0 374 443 B1 | 6/1990 |
| DE | 0 401 580 | 12/1990 |
| DE | 0 418 338 B1 | 3/1991 |
| DE | 0 462 048 B1 | 12/1991 |
| DE | 0 462 049 B1 | 12/1991 |
| DE | 0 512 277 B1 | 11/1992 |

(Continued)

*Primary Examiner*—Scott Bushey
(74) *Attorney, Agent, or Firm*—Herbert Dubno

(57) ABSTRACT

A liquid distributor for packed or filled columns having a multiplicity of horizontal layers involved in heat transfer or mass transfer. At least one layer of the column has an increased density by comparison with the other layers and is designed specifically for flooding. The specific surface can be greater than the specific surface of the underlying layers by a factor of 1.5 to 10.

10 Claims, 8 Drawing Sheets

FOREIGN PATENT DOCUMENTS

| | | |
|---|---|---|
| DE | 196 15 645 A1 | 10/1997 |
| DE | 0 858 830 | 8/1998 |
| EP | 0 068 862 | 1/1983 |
| EP | 0 454 179 A1 | 10/1991 |
| EP | 0 516 087 B1 | 12/1992 |
| EP | 0 270 050 B1 | 1/1993 |
| EP | 0 606 974 A1 | 7/1994 |
| FR | 0 434 510 B1 | 6/1991 |
| WO | WO 93/19335 | 9/1993 |
| WO | WO 97/16247 | 5/1997 |
| WO | WO 98/50752 | 11/1998 |
| WO | WO 98/55221 | 12/1998 |

* cited by examiner

LIQUID DISTRIBUTOR AND METHOD FOR OPERATING THE SAME

CROSS REFERENCE TO RELATED APPLICATIONS

This is a national stage of PCT/EP01/01250 filed 6 Feb. 2001 and is based upon German national application 100 10 810.5 filed 8 Mar. 2000 under the International Convention.

FIELD OF THE INVENTION

The invention relates to a liquid distributor for packing columns and/or solid insert columns with individual, especially horizontal, layers participating in the heat exchange and/or mass transfer.

BACKGROUND OF THE INVENTION

In distillation, absorption, gas scrubbing and like process operations, columns are used which contain baffling for the heat exchange and mass transfer between liquid and gas. These baffles are either comprised of trays, like for example bell trays, tunnel trays, dual flow trays, sieve trays or bubble trays, as randomly distributed packing bodies, like for example Raschig rings, Pall rings or saddles, or as ordered packings. With ordered packings, geometries of a cross channel or cross flow structure are widely used for technical applications. Commercially available types are for example the Montz A3, BSH and B1 types of Montz GmbH, D-40705 Hilden, the Sulzer BX, CY and Mellapak types of Sulzer Chemtech AG, CH 8404 Winterthur, the FLEXIPAC type of Koch-Glitsch, Wichita, Kans. 67208 (USA) and the intalox type of Norton, Akron, Ohio 44309 (USA).

With solid internal and packing columns, it is necessary to ensure the greatest possible uniformity of the distribution of liquid and gas over the column cross section in order to obtain a high separating efficiency. The uniform distribution of the gas can be realized simply since the unavoidable pressure loss in the solid internals and packings by themselves ensure a largely uniform distribution of the gas stream over the column cross section and which for most technical applications is sufficient.

With fixed bed reactors as well, there is the problem of uniform distribution of liquids over the reactor cross section to avoid local overheating, so-called hot spots, from arising. It has thus been found to be advantageous to use distribution devices for the liquid.

The uniform distribution of liquids over the column cross section can be achieved only with difficulty. Special distributors for the liquid are necessary. In the art, a number of distributors constructions are available which operate based upon the principles of damming up of liquids, free overflow or spraying. In K. Sattler: "Thermal Separating Processes" (1988), VCH Verlagsgesellschaft mbH, D-69451, Weinheim, there is found at pages 226 to 231 an overview of technologically useable distributor constructions.

The simplest form of liquid distribution is found in the edge deflector as is described in U.S. Pat. No. 3,099,697, the liquid being guided away from the column wall and being released at some distance from the column wall again. There is no description as to how the liquid trickling density can be made uniform in the remaining regions of the column cross section.

In part, nozzles are used to distribute the liquid over the column cross section. The distribution quality which can thus be achieved is however limited so that this distribution principle is useable only with simple observations or gas scrubbing.

Spreaders are distributors in which the liquid to be distributed from a container which is open upwardly, usually branched channels which extend over the column cross section, over overflow devices.

These overflow devices are comprised, for example, of serrated weirs and must be oriented precisely horizontally in order to ensure a uniform liquid distribution over the column cross section. In a similar manner tubes with openings at their underside can distribute the liquid over the cross section covered by the tube system. Here as well the tubes must be oriented as closely horizontally as is possible.

Since these precisely horizontal orientations can be achieved in practice only with difficulty with the requisite precision, one utilizes distributor systems, in applications with greater requirements as to distribution quality, which operate based upon the damming-up principle. Here the liquid flows out of the channels not over overflow weirs but over narrow openings in the lower regions of the channels. Since the operating state of the liquid damming-up height as a rule amounts to between 0.05 to 0.15 m, the imprecision with respect to horizontal orientation of the distributor device is not as significant as those which operate by the overflow principle. The fabrication cost is, however, significantly higher. Examples of these constructions are EP 374 443 B1, EP 462 048 B1, EP 462 049 B1, EP 434 510 B1, DE 19 615 645 A1, U.S. Pat. No. 4,476,069, U.S. Pat. No. 5,501,079, U.S. Pat. No. 5,192,465 and U.S. Pat. No. 5,518,667.

With very high requirements for the distribution quality, special constructions are used which, in addition to the damming up of the liquid, utilizes the capillary distribution effect. Examples are described in EP 512 277 B1 and U.S. Pat. No. 4,432,913.

Another principle for obtaining a high distribution quality is the intermittent actuation of individual distribution points for the liquid. An example is found in U.S. Pat. No. 4,776,989.

In U.S. Pat. No. 4,569,364 a distributor is described which can be adjusted externally in a targeted manner.

U.S. Pat. No. 5,776,316 describes a collection and distribution device which additionally enables liquid to be exchanged in a targeted manner over the column cross section.

In U.S. Pat. No. 5,387,377, a structurally expensive device is described in which an effort is made to use the distribution device additionally as a mass-exchange element. The parts of the device through which gas flows contains packing which support the mass exchange and which determines the gas throughput through the remaining mass-exchange elements.

A similar effect is described in U.S. Pat. No. 5,695,548. Here a collection of distribution channels, which are arranged in a multiplicity of layers above one another, is traversed in uniflow by gas and liquid. This improves the mass transfer.

Distributors must be provided in packed columns and solid internal columns at the head of the column for distributing the refluxed liquid as well as at all feed locations for the liquid feed. Additionally it is customary with large separations, such numbers of a column to provide intermediate distributors for the liquid. These intermediate distributors suppress the disadvantageous effects of poor distribution of the liquid as in the case of edge flow or stream flow.

The need for liquid distributors is an important economic requirement in the use of solid internal and packing columns. Especially the redistribution of the liquid is expensive in the column 1 since the liquid which flows out of the mass-transfer packing and is to be redistributed is initially collected in a liquid collector 2 via a collecting trough 3 and guided to a downcomer pipe 4 and the liquid distributor 5 (FIG. 1). The minimum height for the total assembly of collection trough, downcomer tubes and the distributor, even with smaller column diameters, is about 1 m and with large-column diameters is normally 1.5 to about 2 m. Since a plurality of these devices are necessary in a column, this gives rise to an increase in the column height by about 25% and higher capital costs.

With liquid mixtures with phase breakdown in the liquid phase, difficulties arise in that usual distributor construction cannot reliably ensure uniform distribution of the two liquid phases over the column cross section. In the case of phase breakdown, it is usually best to initially separate both liquids in phase-separating only and then to introduce them via two separate distribution systems.

OBJECT OF THE INVENTION

It is the object of the invention to provide, in the structurally simplest way, especially without additional redistribution stations and with a minimum height, an optimal distribution and redistribution.

SUMMARY OF THE INVENTION

This object is achieved according to the invention in that at least one layer of the column has a specific surface area which is greater by a factor of 1.5 to 10, preferably by a factor of 2 to 3, than the surface area of the layers lying thereabove and therebelow to ensure a greater density and thus a damming-up and especially a flooding of the layer.

The present invention provides a simple apparatus with which the cost for distribution and especially redistribution of liquid is sharply reduced. It is suitable for solid body internal and packed columns, especially, however, for use in packed columns. Surprisingly, this distribution method can be carried out without requiring additional components like liquid collectors, collecting channels, downcomer tubes and distribution systems. With the modification according to the invention, the baffles which are effective for mass transfer can achieve the liquid distribution effect. The regions of the column in which liquid distribution is effected participate additionally in mass transfer. This reduces the structural height of the column. In addition, the new type of distributor enables also the distribution of two-phase liquid mixtures without development of phase decomposition.

BRIEF DESCRIPTION OF THE DRAWING

Embodiments of the invention are illustrated in the drawing in vertical sections and will be described in greater detail in the following. In the drawing

SPECIFIC DESCRIPTION

Figure 1:
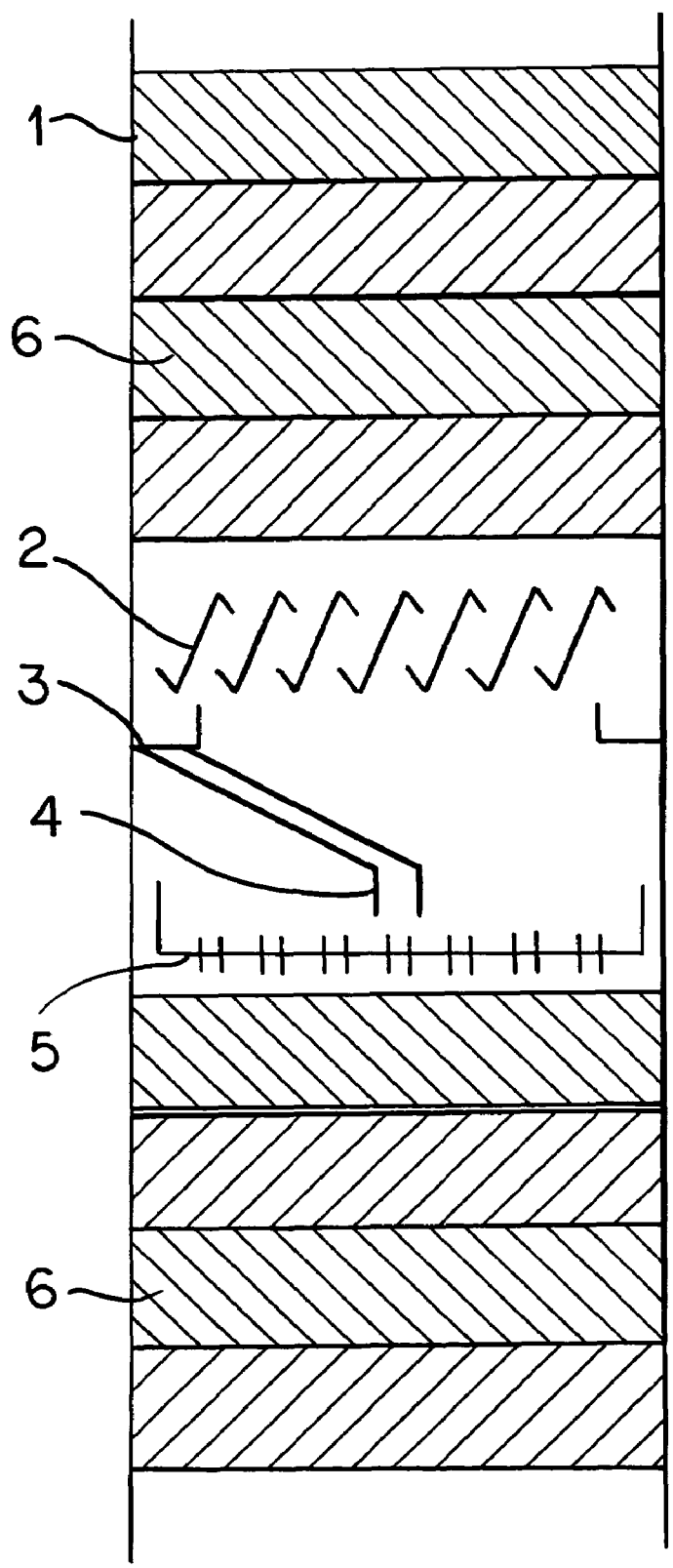
FIG. 1 is a diagrammatic sectional view showing a redistributor according to the state of the art.
Figure 2:
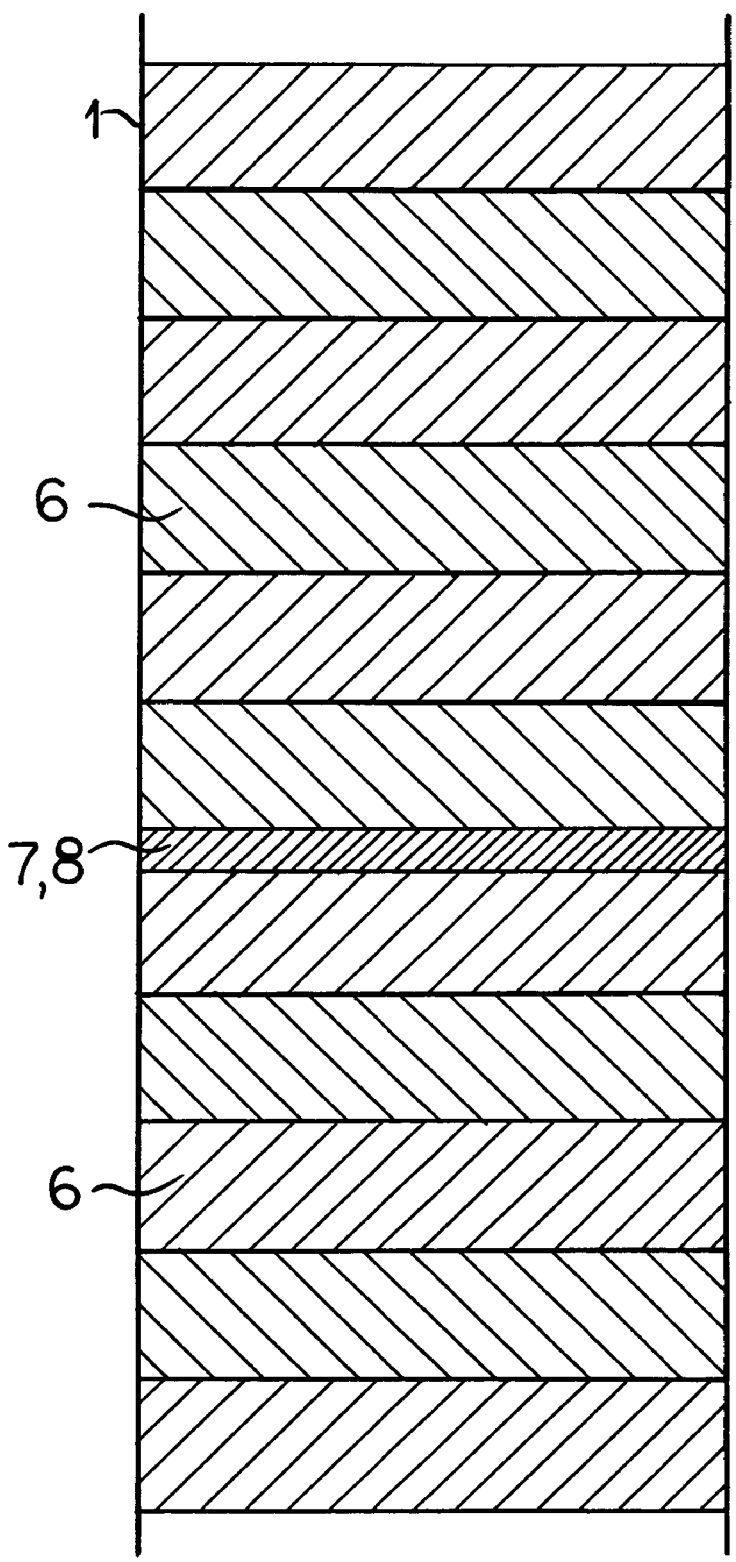
FIG. 2 is a view similar to FIG. 1 showing a configuration according to the invention with a distributor layer, especially a distributor packing layer.

It has been found that the liquid effect of thin, approximately 1 to 20 cm, especially 2 to 4 cm high packing bed layers 7—indicated below as distributor packing 7—or layers of solid internals or filler bodies—below indicated as distributor layer 8—enables a greater surface area per unit volume and a smaller hydraulic diameter to be achieved than the usual packing of a filler body 9 (FIG. 2). The distributor packing has preferably perforations in the form of for example circular holes, whereby the proportion of perforations to the total area is 2 to 80%, preferably 10 to 30%. It is possible to produce the effect of perforations by the use of expanded metal for example as the starting material as in the case of the commercially available packing of the Montz BSH type. The volume specific surface area of the packing layers is greater by a factor of about 1.5 to 10, preferably by a factor of about 2 to 3 than the distillation packing.

Figure 3:
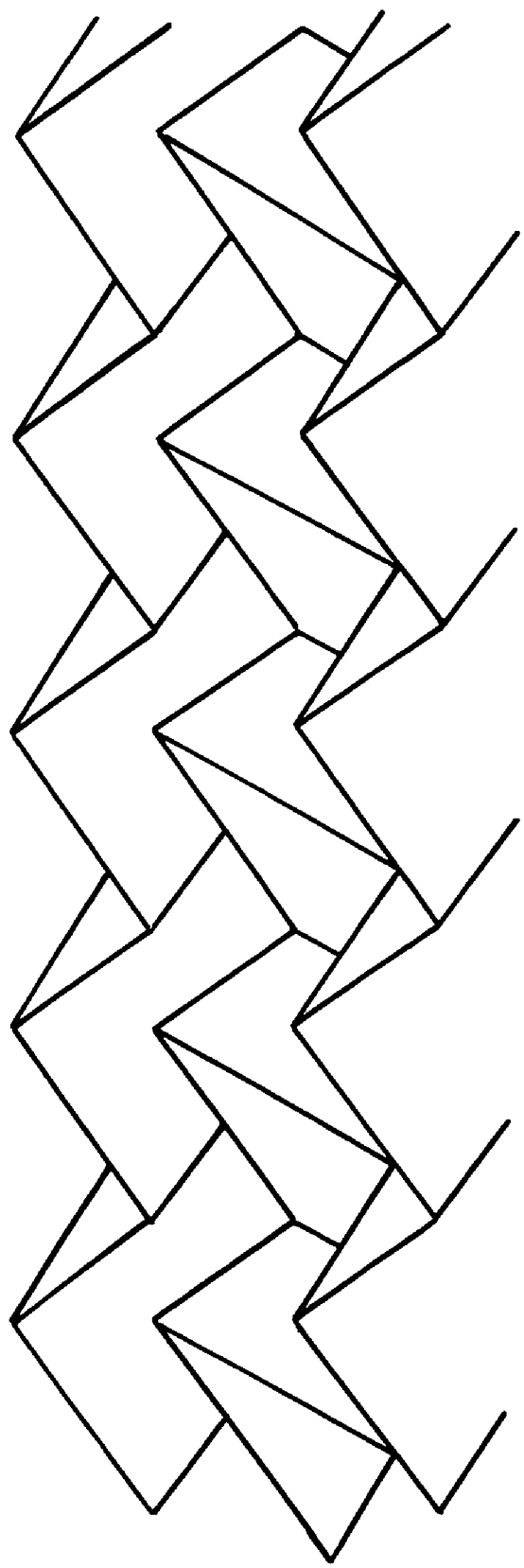
FIG. 3 is a perspective section of a packing with cross channel structure.

The geometry of this distributor packing is optional. It can be used basically for distribution packings of conventional geometries, especially those of widely used cross channel structures. FIG. 3 shows a section of such packing with cross channel structure. This geometry is especially advantageous since even with high perforation preparation, as is preferred for the distributor packing 7, it has still a high strength and especially compressive strength. Examples of suitable packing geometries are device Montz GmbH, D-40704 Hilden, Germany, the type Sulzer BX, CY and Mellapak of Sulzer Chemtach AG, CH-8404 Winterthur, Switzerland, the type FLEXIPAC of Koch-Glitsch, Wichita, Kans. 67208, USA and the intalox type of the firm Norton, Akron, Ohio 44309, USA. Further examples can be found in WO 93/19335, WO 98/50752, WO 98/55221, EP 190 435 A1, EP 201 614 B1, EP 270 050 A1, EP 401 580 B1, EP 454 179 A1, EP 516 087 B1, CH 547 120, U.S. Pat. No. 3,664,095, U.S. Pat. No. 4,710,326 which also have planar and parallel individual elements. It is also possible to use spiral-wound arrangements which are partly not of a cross-channel structure but are parallel to the column axis as for example described in EP 068 862. In addition the distributor packing can be fabricated in the form of structure as for example described in EP 418 338 B1. A further possibility utilizes geometries with rectangular cross sections as are customary in catalyst monoliths and are described for example in EP 606 974 A1. These as well can have configurations parallel to the column axis.

Also for the distribution layer 8, there are no limitations with respect to the geometry of the filling body.

Decisive, as with the distribution packing, is mainly its volume-specific surface area.

The liquid distributing effect of these distributor packing and distributor layers resides in the damming up or preferably flooding by liquid. While the remaining column packing or filling inserts are operated only in the range of film flow, because of the small hydraulic diameters and thin distribution packing 7 and distribution layers 8 have a flooded state because of their flooding operation. The liquid can spread over the column cross section because of the perforations in the distribution packing 7 and in the distribution layers 8 in the manner similar to that of the principle of communicating tubes and can flow downwardly at their lower ends.

The best distribution effect is produced when the distributor packing 7 and the distributor layers 8 are operated in a flooded state. The pressure loss which then results can be about 1 to 5 mbar per liquid distributor and reduces the flooded state when normal pressure, overpressure or moderate vacuum above about 20 mbar is used as the operating pressure.

Tests have shown surprisingly that while there is indeed a reduced distribution effect, even in the damming up region, the distribution effect is nevertheless sufficient for technical purposes especially with intermediate distributors. In this region the pressure drop is about 0.2 to 1 mbar per distributor and is substantially lower and opens the door to application possibilities with low operating pressures.

While conventional liquid collectors and redistributors cannot directly participate in mass exchange efficiently, the damming up effect of the distributor packing 7 and the distributor layer 6 additionally increase the separating efficiency. In a doctoral project entitled "Investigations into Improvement of Their Body and Separating Efficiency and Distillation Packings" completed by B. Kaibel in 1999 at the Institute for Thermal Process Technology of the Karlsruhe University, combinations of alternating thin packing layers with small hydraulic diameters and conventional packing layers were investigated. It was found that by means of the damming up of the liquid in the thin packing layers, the separating efficiency could be raised by up to 50% relative to the height. In this work, however, no indication was given as to the liquid distributing effect of the thin packing layer.

Packing arrangements with height-variable geometry have already been described numerous times but with other purposes. Suggestions of a liquid distribution effect are not there to be found. The goal of using packings with height-variable geometry is, on the contrary, that of avoiding flooded states, especially in lower regions of the packing layers. This should enable higher throughputs of gas and liquid.

In EP 858 830 A1, one seeks to increase the spacing of neighboring packing elements at the lower edge of the packing layer by there reducing the break height. As additional possibilities, the partial or complete removal of a part of the material at the lower end of the packing layer, for example at each second packing element, is described. This approach serves to reduce the damming up of liquid at the lower ends of the packing layer. A liquid distributing effect does not arise.

In WO 97/16247, the feature is protected that the geometry of the cross channel structure can be altered. The break is not more than usually straight but S-shaped configuration and is so arranged that the break or bend direction at lower and upper ends of the packing layer run approximately vertically. Also this approach is intended to reduce the damming up of liquid and gives rise to no liquid distribution effect.

DE 2 921 270 C2 describes a packing with height-variable geometry in which the bends of the cross channel structure at the lower end run vertically. Here as well a damming up of the liquid should be prevented. There is no liquid distribution effect.

In DE 2 921 270 C2, a packing with a cross channel structure is described in which the bends have an arcuate pattern. No targeted flooded state can be achieved with this device with a liquid distributing effect.

Figure 4:
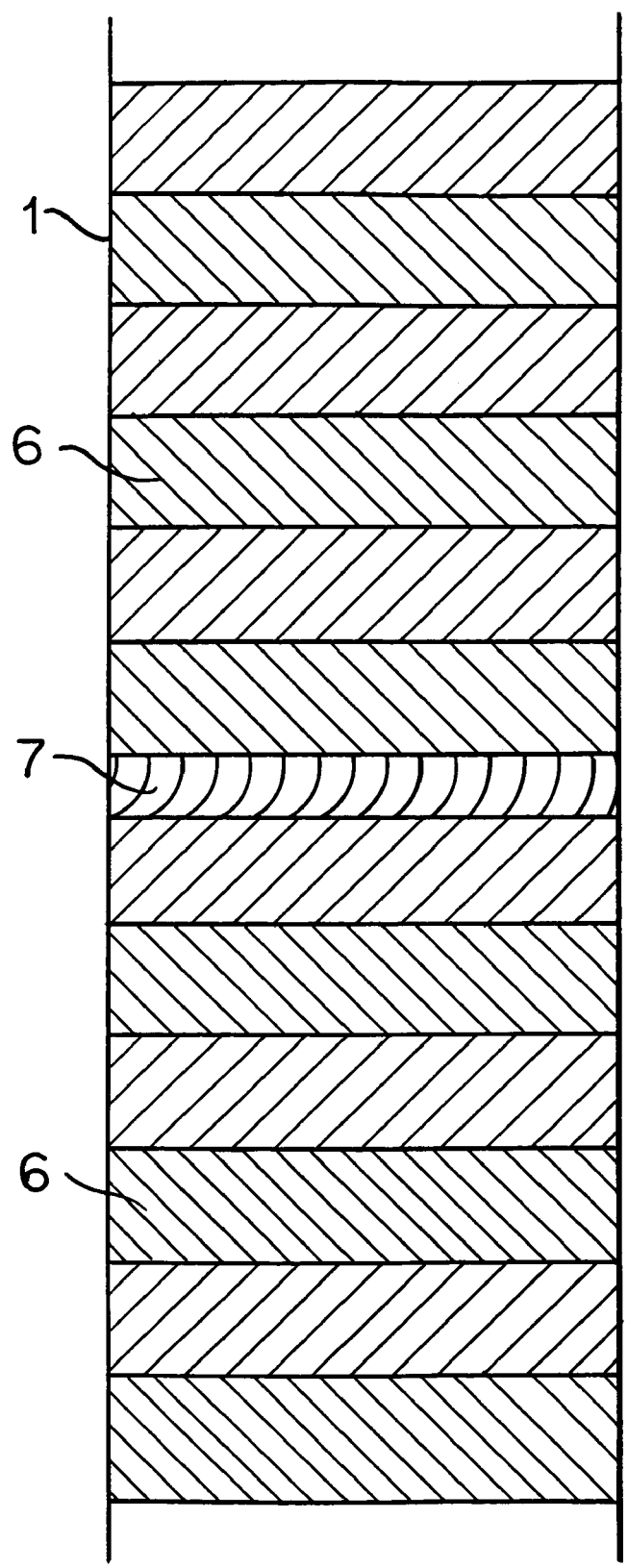
FIG. 4 is a diagrammatic section showing the form and mounting of individual sheets.

The desired flooded state in the lower partial region of distributor packing 7 can be produced however by a new arrangement of the individual sheet metal element as has been basically described in DE 2 921 270 C2. The individual sheet metal plates are mounted as shown in FIG. 4 so that the greatest flow resistance arises at the respective lower ends. In addition, the individual sheet metal plates are perforated at least in the partial region with the greatest flow resistance in order to support the liquid transverse distribution in the flooded state.

Preferably the distributor packing is also perforated in the partial region without the greatest flow resistance. The proportion of perforations to the total area should be between 2 and 80%, in this region preferably 10 to 30%. This will further support the transverse liquid distribution further since then the entire region of the distribution packing by forming a bubble state, enables transverse liquid exchange.

Figure 5:
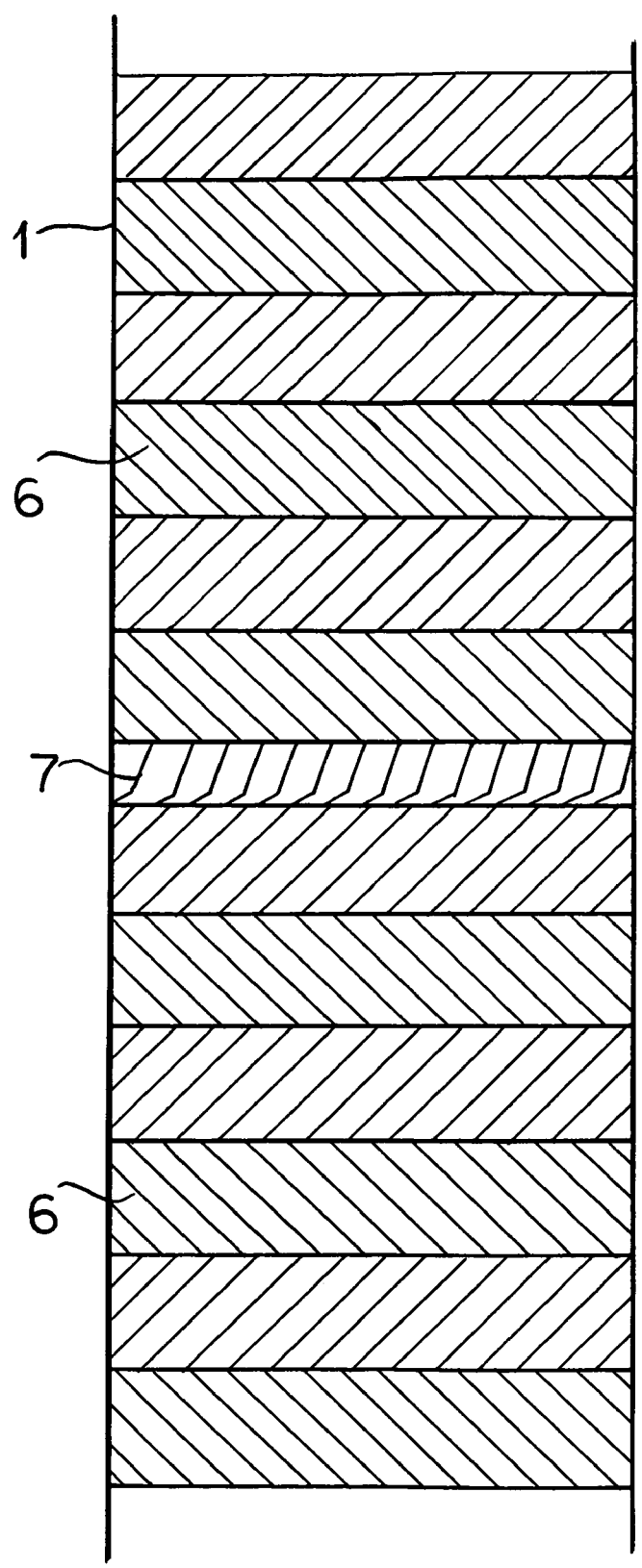
FIG. 5 is a diagrammatic section showing individual sheets with bend pattern.

Alternatively to a continuously curved bend pattern, a geometry is also possible in which the bend pattern at the lower end of the distributor packing 7 is inclined to a greater extent with respect to the horizontal than at the upper end (FIG. 5). Also in this case, the distributor packing 7 is preferably equipped with perforations like distributor packing with the arcuate bend pattern.

Figure 6:
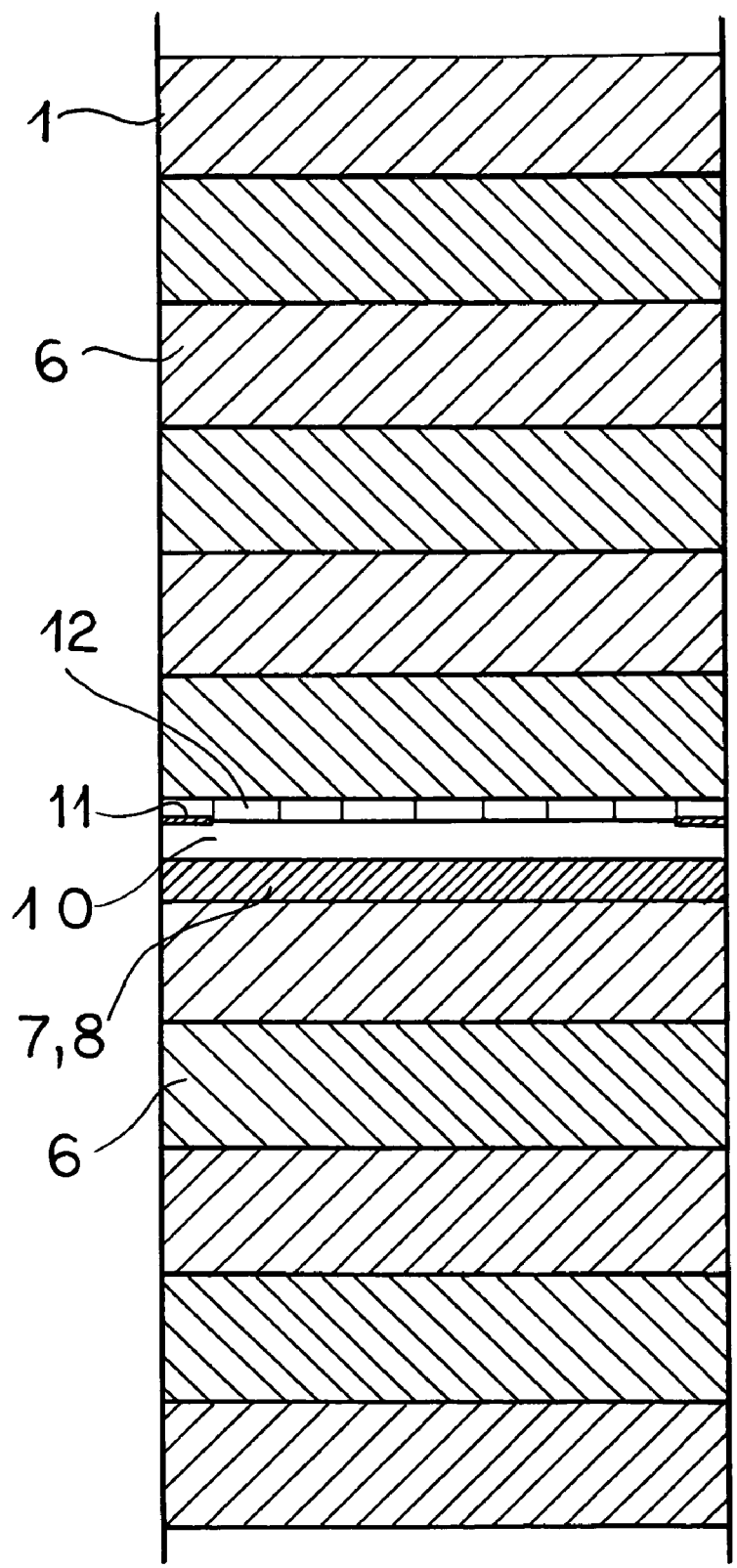
FIG. 6 is a diagrammatic section of a configuration with support ring and support grate.

It is alternatively also possible to use the thin distributor packing 7 or distributor layers 8 alone and above them to provide a free space 10 in which a transverse exchange of the liquid can be established. The bubbling liquid can freely distribute itself above the thin distributor packing 7 or distributor layers 8. FIG. 6 shows a possibility of one embodiment structure for this purpose with a seating ring 11 and a seating grate 12. However other optional constructions of spaces can be used which enable the transverse exchange of the liquid.

Figure 7:
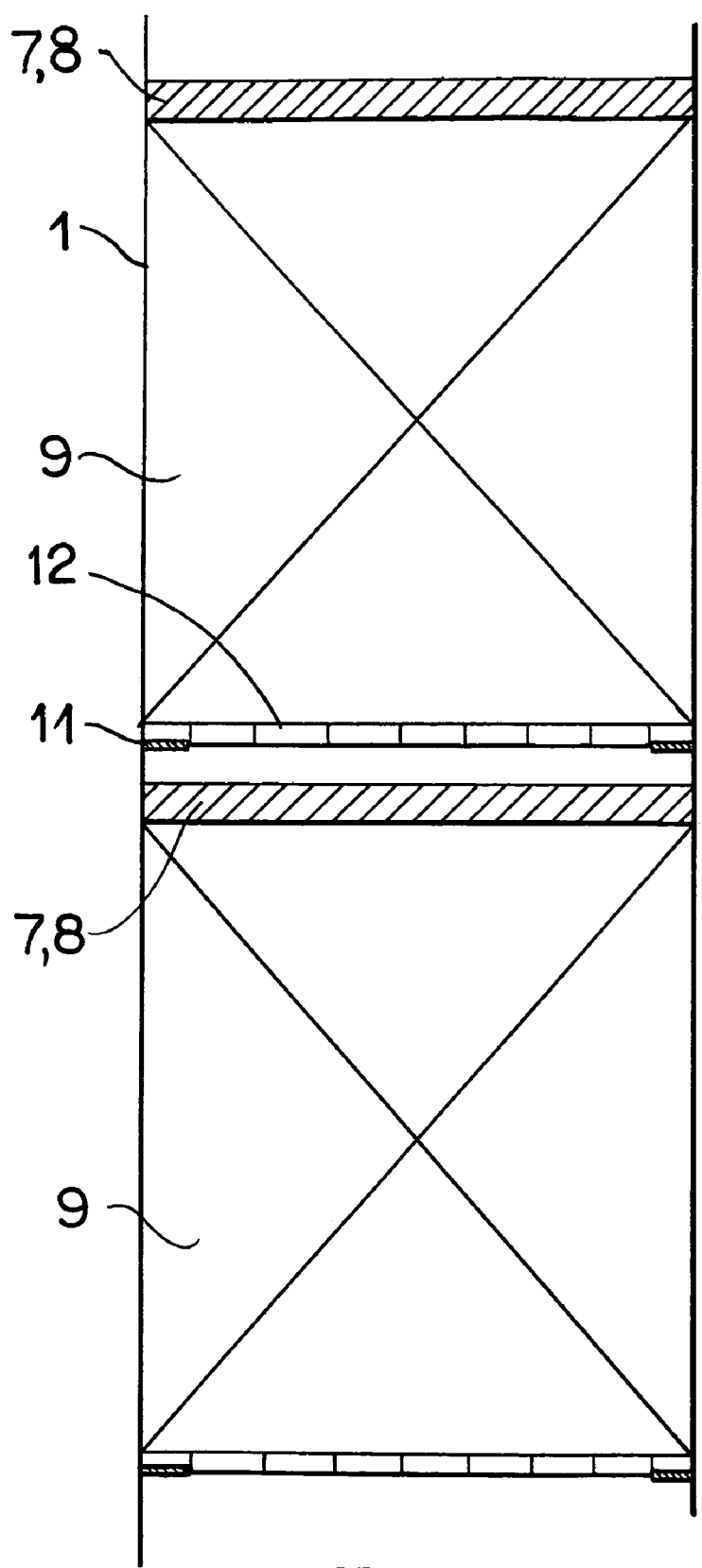
FIG. 7 is a diagrammatic section showing distributor packing/layering with increased flow resistance.
Figure 8:
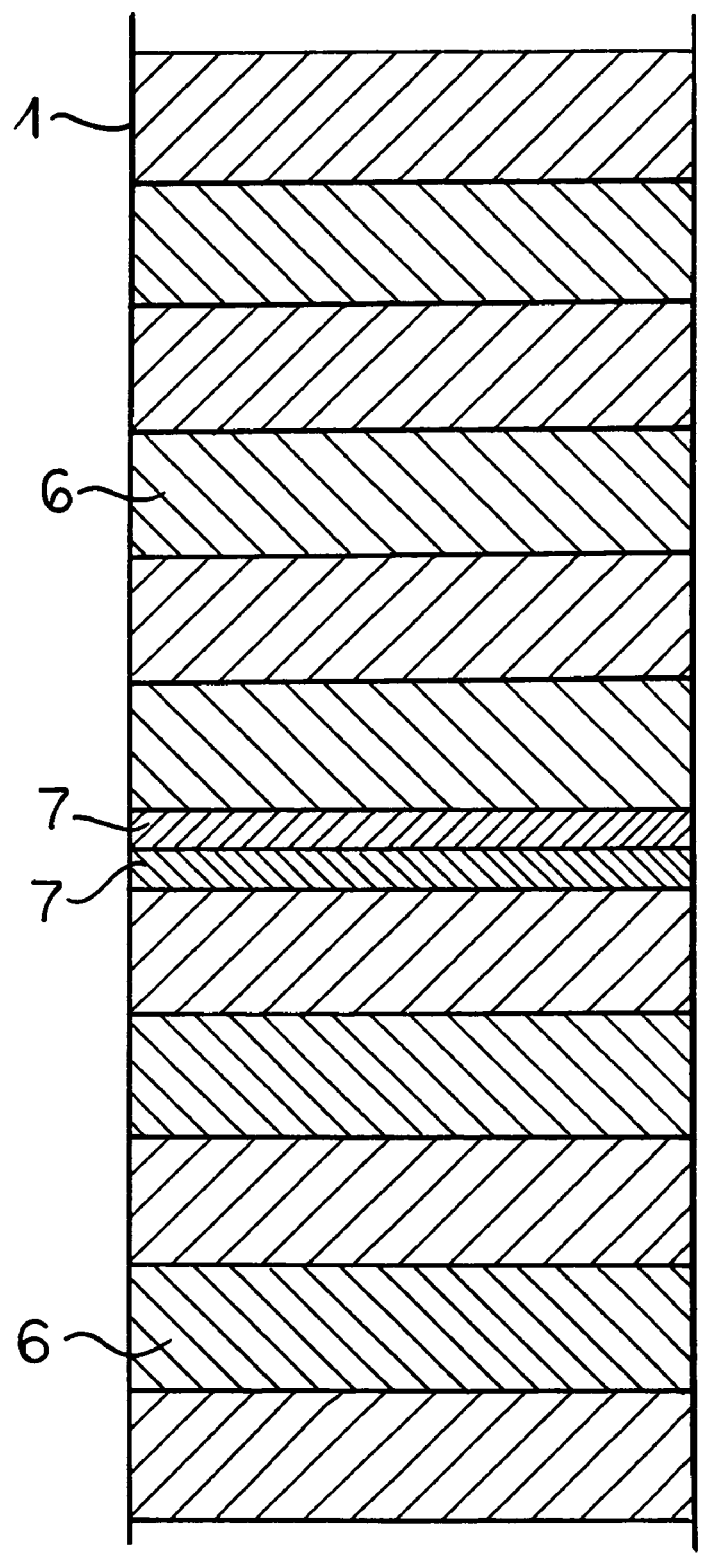
FIG. 8 is a sectional view of distributor packing/layering disposed directly above one another.

Instead of the preferred thin distributor packing 7 or distributor layers 8, basically other devices can be used which, by comparison to the packing employed, provide an increased flow resistance and a bubble state (FIG. 7). It is for example possible to use one or more layers of wire mesh or wire netting or wound packing. It is a further possibility to use bubble plates or open pore foam structures which can be, for example, monolithic. These features can be combined in optional ways so that, for example, arrangements of wire netting or solid internal or foam structures can be used on bubble plates. In any case two or more distributor packings 7 can be arranged directly above one another in order to improve the distribution quality (FIG. 8).

In any case, the possible operating range has proved to be narrow from the viewpoint of the throughput of gas and liquid.

In experimental investigations it has been found that the ordered packing with reduced cross actions as distributor packing 7 has an especially wide and stable operating range. This compensates for its more expensive structural configuration with higher fabrication cost. When the operating range does not vary significantly with respect to the throughput, solutions which have been developed for respective separating problems as, for example, wire mesh can be used. To achieve a permissible operation also with varying loading states however the use of ordered packing with reduced cross section is recommended.

The distributor packing 7 and the distributor layers 8 with reduced hydraulic diameter or the modified distributor packing which only provide damming up at their lower end can be used not only with packed columns but also with solid internal columns to function as liquid distributors. It is here however required that these packing layers be built in precisely horizontally. This can best be achieved with a support ring 11, as with tray columns to receive the trays, in combination with a support grate 12.

The height of the distributor packing 7 or distributor layer 8 should even with small column diameters, be less than 0.8 m preferably at least 0.02 m and better between 0.03 and 0.05 m. With larger column diameters, these values can be increased. It is recommended to determine the height H of the distributor packing or distributor layer preferably in accordance with the relationship $$H=0.02 \text{ m}+0.01*D$$

where D is the diameter of the column. With greater requirements with respect to the distributor quality, it is recommended that these values be doubled.

It is also possible to arrange two or more distributor packings 7 directly above one another in order to improve the distribution quality (FIG. 8).

For the choice of the sizes of the distributor packing 7 or distributor layer 8 one can refer to the usual commercial literature especially also brochures distributed by the firms for comparison with the mass exchange packing 6 or the internals 9. When the distributor packing 7 and the distributor layer 8 are to be operated in a flooded state, it is a coarse rule that the surface area of the distributor packing and the distributor layer per unit volume be selected to be twice as great as in the case of the mass exchange packing 6 and the solid internals 9. This is based upon the rule that the partitions usually should be set up to allow about 70 to 80% of the flooded load. Since the gas loading factor or F factor—defined as the (gas velocity) times (gas density)$^{0.5}$—at the flooding point is proportional to the—(hydraulic diameter)$^{0.5}$, it follows directly that with a doubling of the specific surface area, a flooded state can be achieved. The hydraulic diameter of packings and internals as a rule is given by four-specific surface areas. Thus, for example, for a distillation packing 6 with a specific area of 250 m$^2$-mq, the distributor packing 7 will be suitable with a specific surface area of 500 m$^2$-mq.

The bend angle which the bends of the distributor packing 7 form can, as in current distillation packings of a cross channel structure, amount to 60° to 90°. However greater or smaller angles can be used.

In order to avoid an unnecessary release of fine droplets, the bends preferably are not configured with sharp edges but rather are rounded whereby the bend ratio amounts to about 10 to 20% of the bend width.

The inclination of the bends to the horizontal can amount to about 30 to 60°. Values of 45° are preferred.

Neighboring packing layers 6 and distributor packing 7 are preferably rotated with respect to one another through 90°.

In building the packing layers into the columns, the layers are preferably additionally dynamically loaded (for example by hammering) or statically loaded (for example by the application of weights) so that the number of contact points is increased. The effect of this feature depends upon the packing material used and is known to the worker in the art.

The distributor packing and distributor layers can optionally be combined with conventional predistributors of simple construction. Here predistributors, for example, nozzles, can be effective for a large area coarse distribution of the liquid. In the distributor packings or distributor layers disposed beneath the predistributor, a fine distribution will be effected.

The invention encompasses in addition a method of operating a column equipped with distributor packings 7 or distributor layers 8 in which the gas loading, the liquid loading or the gas loading and the liquid loading together are so adjusted that a flooded state is established in the distributor packing 7 and the distributor layers 8 or by application of reduced pressure loss, there is at least a damming of liquid. In a further method, two-phase liquid mixtures without prior phase separation are distributed.

The invention claimed is:

1. A liquid distributor for packed columns and/or solid insert columns with individual layers disposed horizontally and participating in heat exchange and/or mass transfer, said layers comprising at least one layer of the column formed as a distributor layer with a greater density than other layers of the column and configured for a damming up and flooding, said at least one layer having a specific surface area for a distribution of the liquid which is greater by a factor of 1.5 to 10, than the specific surface area of the layers lying above and below the at least one layer, said at least one layer having a cross channel structure comprised of a plurality of strips with lateral surfaces lying against one another and provided with ribs transverse to a longitudinal direction of the strip, the strips being so arranged that the ribs of strips in contact with one another cross each other, the height of said at least one layer being 0.01 to 0.5 m.

2. The liquid distributor according to claim 1 wherein the height of the distributor layer is approximately 0.01 to 0.2 m.

3. The liquid distributor according to claim 1 wherein the distributor layer has perforations in the form of circular holes whereby the proportion of perforations to the total area is about 2 to 80%.

4. The liquid distributor according to claim 3 the proportion by area of the perforations varies over the height of the packing and the proportions by areas of the perforations decreases from the bottom to the top packing edge.

5. The liquid distributor according to claim 1 wherein said factor is 2 to 3.

6. The liquid distributor according to claim 1 wherein above the distributor layer, separated by spacer elements, a free space with a height of 0.01 to 0.2 m, is provided in which a transverse exchange of the liquid occurs.

7. A liquid distributor according to claim 1 wherein the ribs of mutually contacting strips run into arcs which lie parallel to one another, whereby the arcs have a circular segmental pattern and the ribs at the lower edge of the packing have angles of 10° to 40° with respect to the horizontal and the ribs at upper edges of said strips have angles of 45° to 88° and these inclinations are either in the same or in the opposite directions as at the upper end of the packing.

8. The liquid distributor according to claim 7 wherein the circular pattern is approximated by a multiplicity of straight pieces and the pattern at a lower end of said one of said packing layers is more weakly inclined to the horizontal than at the upper end of said one of said packing layers.

9. The liquid distributor according to claim 8 wherein the bend angle, which the bends of the packing of said one of said layers form with reduced cross section, amounts to about 60° to 90° and the bends are of rounded configuration whereby the bend radius amounts to about 10 to 20% of the bend width.

10. The liquid distributor according to claim 1 wherein the packing comprises one or more layers of wire mesh or wire net, packing rolls from strip or fabric webs, or open-pore structures of monoliths.

* * * * *